United States Patent
Kim et al.

(10) Patent No.: US 10,726,289 B2
(45) Date of Patent: Jul. 28, 2020

(54) METHOD AND SYSTEM FOR AUTOMATIC IMAGE CAPTION GENERATION

(71) Applicant: Korea Electronics Technology Institute, Seongnam-si (KR)

(72) Inventors: Bo Eun Kim, Seoul (KR); Choong Sang Cho, Seongnam-si (KR); Hye Dong Jung, Seoul (KR); Young Han Lee, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 106 days.

(21) Appl. No.: 16/043,338

(22) Filed: Jul. 24, 2018

(65) Prior Publication Data
US 2019/0286931 A1    Sep. 19, 2019

(30) Foreign Application Priority Data
Apr. 14, 2018  (KR) .................. 10-2018-0029832

(51) Int. Cl.
| | | |
|---|---|---|
| G06K 9/46 | (2006.01) |
| G06T 7/00 | (2017.01) |
| G06N 5/04 | (2006.01) |
| G06N 3/08 | (2006.01) |
| G06F 40/20 | (2020.01) |
| G06F 40/169 | (2020.01) |
| G06N 3/04 | (2006.01) |
| G06N 5/02 | (2006.01) |

(52) U.S. Cl.
CPC ............. *G06K 9/46* (2013.01); *G06F 40/169* (2020.01); *G06F 40/20* (2020.01); *G06N 3/08* (2013.01);
(Continued)

(58) Field of Classification Search
CPC ........ G06N 3/08; G06N 3/0454; G06N 5/046; G06N 3/0427; G06N 3/0445;
(Continued)

(56) References Cited

U.S. PATENT DOCUMENTS 10,467,274 B1 * 11/2019 Ren ..................... G06K 9/4604
2017/0061250 A1 * 3/2017 Gao ..................... G06F 16/3347
(Continued)

OTHER PUBLICATIONS

Korean Office Action dated Feb. 25, 2020 in corresponding Korean Patent Application No. 10-2018-0029832 (4 page in English, 6 pages in Korean).
(Continued)

*Primary Examiner* — Jaime M Holliday
(74) *Attorney, Agent, or Firm* — NSIP Law

(57) ABSTRACT

A method and a system for automatic image caption generation are provided. The automatic image caption generation method according to an embodiment of the present disclosure includes: extracting a distinctive attribute from example captions of a learning image; training a first neural network for predicting a distinctive attribute from an image, by using a pair of the extracted distinctive attribute and the learning image; inferring a distinctive attribute by inputting the learning image to the trained first neural network; and training a second neural network for generating a caption of an image by using a pair of the inferred distinctive attribute and the learning image. Accordingly, a caption well indicating a feature of a given image is automatically generated, such that an image can be more exactly explained and a difference from other images can be clearly distinguished.

11 Claims, 5 Drawing Sheets

(52) U.S. Cl.
CPC ........... G06N 5/046 (2013.01); G06T 7/0002 (2013.01); *G06N 3/0427* (2013.01); *G06N 3/0445* (2013.01); *G06N 3/0454* (2013.01); *G06N 5/02* (2013.01)

(58) Field of Classification Search
CPC ...... G06N 3/0481; G06N 5/02; G06F 17/241; G06F 17/27; G06K 9/46; G06T 7/0002
See application file for complete search history.

(56) References Cited

U.S. PATENT DOCUMENTS

| | | | |
|---|---|---|---|
| 2017/0147910 A1* | 5/2017 | Mao | G06K 9/726 |
| 2017/0200065 A1* | 7/2017 | Wang | G06N 3/08 |
| 2017/0236055 A1* | 8/2017 | Lin | G06N 3/0472 706/20 |
| 2018/0130496 A1* | 5/2018 | Mahapatra | G06K 9/00718 |
| 2018/0329892 A1* | 11/2018 | Lubbers | G06K 9/00671 |

OTHER PUBLICATIONS

Kim, et al., "Design of a Deep Neural Network Model for Image Caption Generation," KIPS Tr. Software and Data Eng., 2017, vol. 6, No. 4, pp. 203-210. https://doi.org/10.3745/KTSDE.2017.6.4.203.

Lee, "Image Caption Generation using Recurrent Neural Network," Journal of KIISE, The Korean Institute of Information Scientists and Engineers, vol. 43, No. 8, Aug. 2016, pp. 878-882, http://www.dbpia.co.kr/journal/articleDetail?nodeId=NODE06737196.

* cited by examiner

| | Related Art | Present disclosure |
|---|---|---|
|  | A man sitting on top of a grass covered field. | A young boy sitting on top of a lush green field |
|  | A man is riding a bike on the road | A man riding a motorcycle on a dirt road |

METHOD AND SYSTEM FOR AUTOMATIC IMAGE CAPTION GENERATION

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on Mar. 14, 2018, and assigned Serial No. 10-2018-0029832, the entire disclosure of which is hereby incorporated by reference.

TECHNICAL FIELD OF THE INVENTION

The present disclosure relates generally to artificial intelligence technology, and more particularly, to a method and a system for automatically generating a caption indicating a feature of an image by utilizing artificial intelligence technology.

BACKGROUND OF THE INVENTION

Automatic image caption generation technology automatically generates a sentence explaining a given image. With the rapid enhancement of artificial intelligence technology, it is possible to provide the automatic image caption generation function.

A caption automatically generated by using artificial intelligence technology matches an overall content of the image, but has a limit to well explaining an important feature of each image.

Therefore, there is an inconvenience that artificial corrections should be made to the automatically generated caption. There is a demand for a method for solving this problem.

SUMMARY OF THE INVENTION

To address the above-discussed deficiencies of the prior art, it is a primary aspect of the present disclosure to provide a method and a system for automatically generating a caption well indicating a feature of a given image, by which an image can be more exactly explained and a difference from other images can be clearly distinguished.

According to an embodiment of the present disclosure to achieve the above-described aspects, an automatic image caption generation method includes: extracting a distinctive attribute from example captions of a learning image; training a first neural network for predicting a distinctive attribute from an image, by using a pair of the extracted distinctive attribute and the learning image; inferring a distinctive attribute by inputting the learning image to the trained first neural network; and training a second neural network for generating a caption of an image by using a pair of the inferred distinctive attribute and the learning image.

The extracting may include: calculating a score of each word included in the example captions, the score indicating how well the word expresses a feature of the learning image; and outputting a matching relationship between the words and the corresponding scores as the distinctive attribute.

According to an embodiment of the present disclosure, the automatic image caption generation method may further include selecting some of the words included in the example captions, and the calculating may include calculating scores of the selected words indicating how well the words expresses the feature of the learning image.

The selecting may include extracting only roots by pre-processing the words included in the example captions, and selecting a predetermined number of words from the extracted roots.

The selecting may include selecting a predetermined number of words, based on at least one of a frequency that the words appear in the example captions of the learning image, and a frequency that the words appear in example captions of other learning images.

The calculating may include assigning scores to the words in proportion to a number of times the words appear in the example captions of the learning image.

The calculating may include assigning scores to the words in inverse proportion to a number of times the words appear in example captions of other learning images.

According to an embodiment of the present disclosure, the automatic image caption generation method may further include: receiving an input of an inference image for generating a caption; inferring a distinctive attribute by inputting the inputted inference image to the trained first neutral network; and generating a caption by inputting a pair of the inferred distinctive attribute and the inference image to the trained second neutral network.

According to another embodiment of the present disclosure, a computer-readable recording medium has a program recorded thereon, the program performing an automatic image caption generation method, including: extracting a distinctive attribute from example captions of a learning image; training a first neural network for predicting a distinctive attribute from an image, by using a pair of the extracted distinctive attribute and the learning image; inferring a distinctive attribute by inputting the learning image to the trained first neural network; and training a second neural network for generating a caption of an image by using a pair of the inferred distinctive attribute and the learning image.

According to another embodiment of the present disclosure, an automatic image caption generation method may include: receiving an input of an inference image for generating a caption; inferring a distinctive attribute by inputting the inputted inference image to a trained first neutral network; and generating a caption by inputting a pair of the inferred distinctive attribute and the inference image to a trained second neutral network. The first neural network may be a neural network that is trained by a pair of a distinctive attribute extracted from example captions of a learning image and the learning image to infer a distinctive attribute from the image, and the second neural network may be a neural network that is trained by a pair of the distinctive attribute inferred by the first neural network and the learning image to generate a caption of the image from the image.

According to another embodiment of the present disclosure, an automatic image caption generation system may include: a communication unit configured to receive an input of an inference image for generating a caption; and a processor configured to infer a distinctive attribute by inputting the inputted inference image to a trained first neutral network, and to generate a caption by inputting a pair of the inferred distinctive attribute and the inference image to a trained second neutral network. The first neural network may be a neural network that is trained by a pair of a distinctive attribute extracted from example captions of a learning image and the learning image to infer a distinctive attribute from the image, and the second neural network may be a neural network that is trained by a pair of the distinctive attribute inferred by the first neural network and the learning image to generate a caption of the image from the image.

According to various embodiments of the present disclosure as described above, a caption well indicating a feature of a given image can be automatically generated, such that an image can be more exactly explained and a difference from other images can be clearly distinguished.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

The present disclosure will be described in more detail with reference to the accompanying drawings.

In an automatic image caption generation method according to an embodiment of the present disclosure, a distinctive attribute expressing details included in an image is automatically extracted, and an image caption is generated by using the extracted distinctive attribute.

The distinctive attribute refers to scoring words (attribute) regarding how well the words express a feature of a corresponding image. The distinctive attribute is automatically extracted and used, such that a caption indicating the image more exactly and clearly can be generated.

Figure 1:
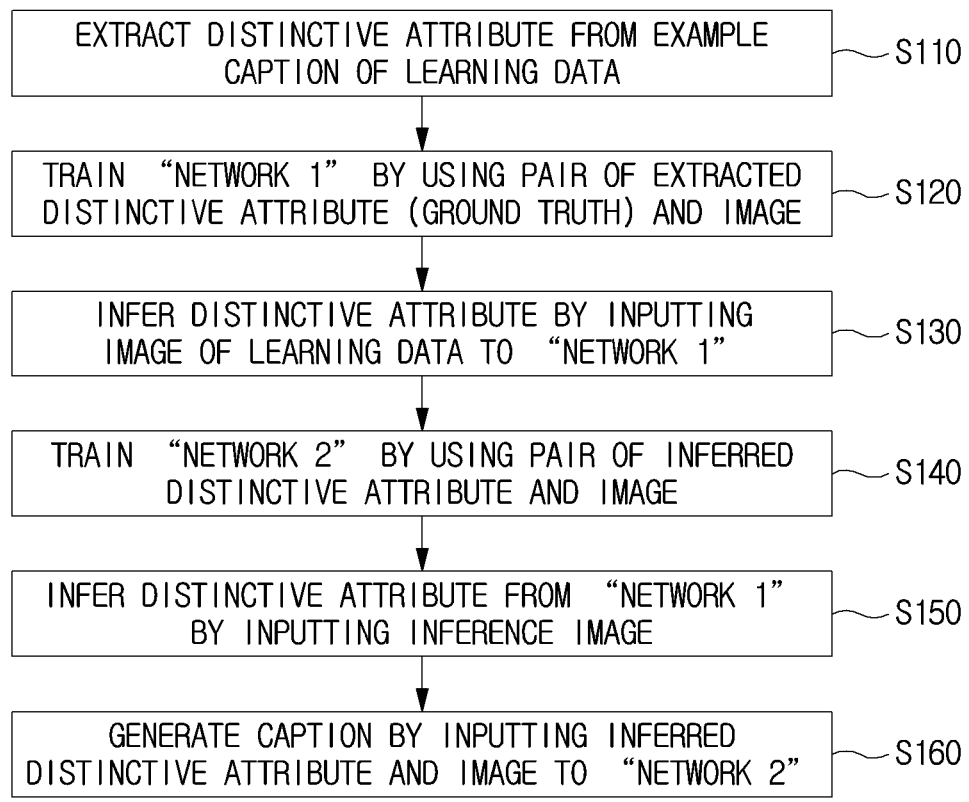
FIG. 1 is a flowchart provided to illustrate an automatic image caption generation method according to an embodiment of the present disclosure.
Figure 2:
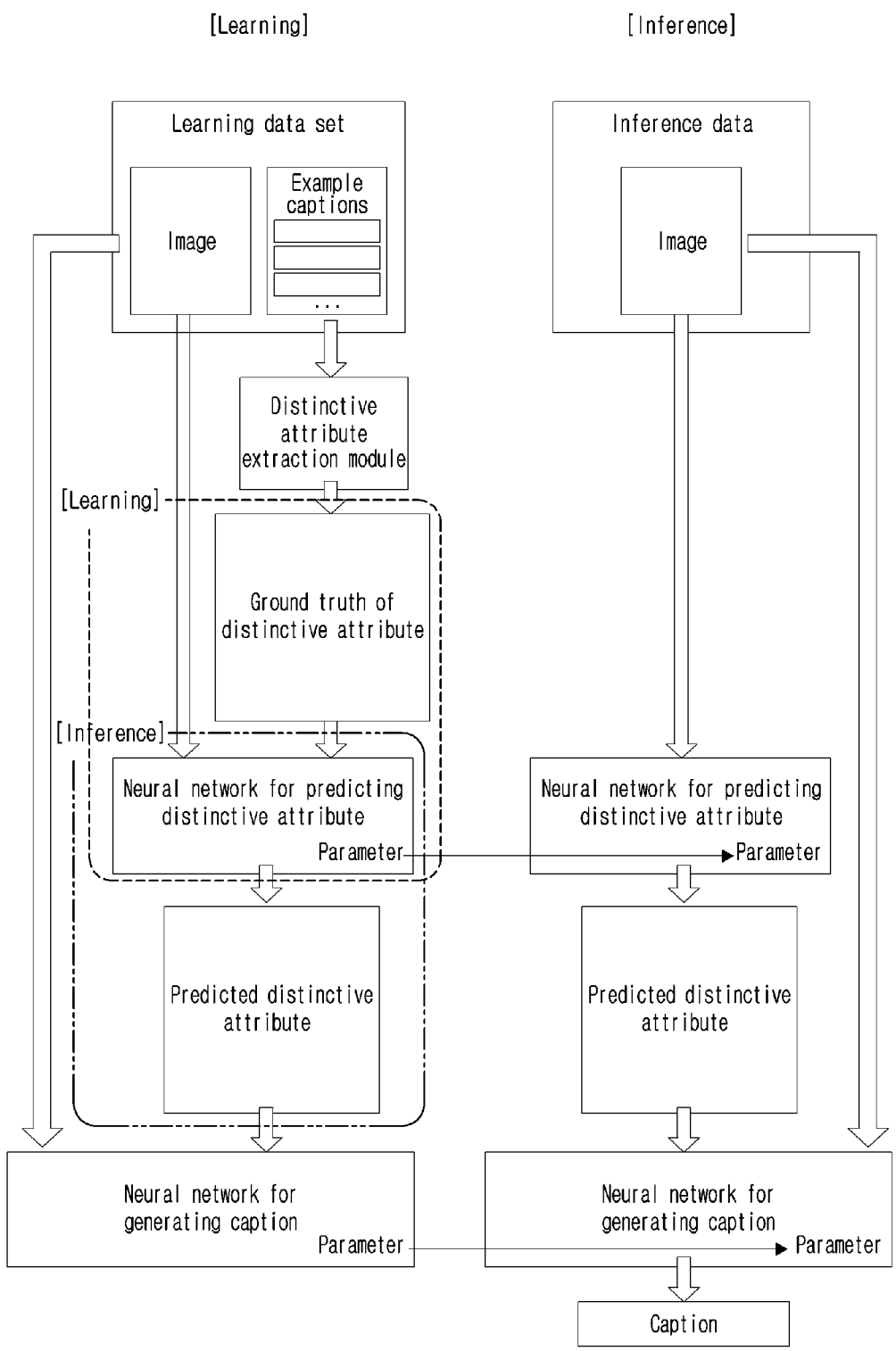
FIG. 2 is a framework for performing the automatic image caption generation method illustrated in FIG. 2.

FIG. 1 is a flowchart provided to illustrate an automatic image caption generation method according to an embodiment of the present disclosure, and FIG. 2 is a framework for performing the automatic image caption generation method illustrated in FIG. 1.

Steps S110 to S140 of FIG. 1 and [Learning] of FIG. 2 correspond to a process of training a neutral network, and steps S150 and S160 of FIG. 1 and [Inference] of FIG. 2 correspond to a process of automatically generating a caption regarding a given image by using the trained neural network.

In the learning process, first, a distinctive attribute is extracted from example captions of an image for learning (hereinafter, referred to as a "learning image") (S110), as shown in FIG. 1 and FIG. 2.

The distinctive attribute is extracted by the following processes.

First, some of the words included in the example captions of the learning image are selected and form a vocabulary. To achieve this, only roots are extracted by pre-processing the words included in the example captions, and a predetermined number of words are selected from the extracted roots in order of the frequency that the words appear in example captions of other learning images from highest to lowest.

Herein, in this process, the pre-processing may be optional and may be omitted. Furthermore, a predetermined number of words may be selected in order of the frequency that the words appear in example captions of other learning images from lowest to highest, or only words in the range of the middle frequency may be selected.

In addition, a predetermined number of words may be selected in order of the frequency that the words appear in the example captions of the learning image from highest to lowest or vice versa, or only words in the range of the middle frequency may be selected.

Furthermore, a predetermined number of words may be selected based on scores, as will be described below. Specifically, a predetermined number of words may be selected according to scores from highest to lowest.

Next, a score indicating how well each of the selected words expresses the feature of the learning image is calculated. The score is calculated according to the following rules.

1) The score of a word is higher as the number of times the word appears in the example captions of the leaning image is higher. That is, the score of a word is calculated in proportion to the number of times the word appears in the example captions of the learning image.

2) The score of a word is lower as the number of times the word appears in the example captions of other learning images is higher. That is, the score of a word is calculated in inverse proportion to the number of times the word appears in the example captions of other learning images.

According to the above-described rules, a word that explains the corresponding learning image but does not explain other learning images is assigned a high score. This is because such a word has a distinctive feature about the corresponding image.

There is no limit to a specific number of words forming a vocabulary. An appropriate number of words as necessary may be implemented. As the number of words increases, the caption is formed of normal words and stability is enhanced. As the number of words decreases, distinction from other images increases.

A matching relationship between the selected words and their scores is the distinctive attribute extracted in step S110.

Next, a neural network 1 for predicting a distinctive attribute from the image is trained by using a pair of the "distinctive attribute extracted in step S110" and the "learning image" (S120).

Figure 3:
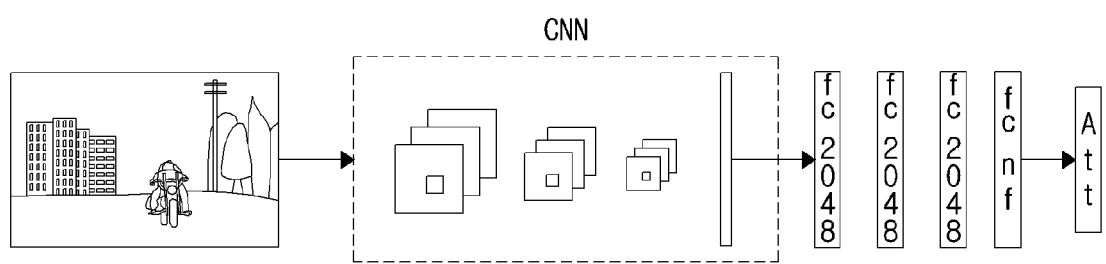
FIG. 3 is a view illustrating a neural network for predicting a distinctive attribute from an image.

The neutral network 1 includes a convolutional neural network (CNN) and a predetermined number of fully connected layers (FCLs) as shown in FIG. 3. The CNN may use models such as ResNet, VGG-net, AlexNet, DenseNet, etc. The number of FCLs and a channel size may be set according to the need.

For example, the neutral network 1 may use three 2048 sizes, and 1 vocabulary of the attribute, and all of the four layers may use relu as an activation function. However, the neural network 1 may be implemented in different forms.

In the learning process, batch normalization and dropout may be used. A cost function may use a mean squared error, a mean absolute error, a mean squared logarithmic error, a hinge, or the like.

Thereafter, a distinctive attribute is inferred by inputting the learning image to the neutral network 1 which is trained in step S120 and has a parameter set (S130). A result of inferring in step S130 is used as training data of the neural network for generating a caption of an image.

That is, a neural network 2 for generating a caption of an image is trained by using a pair of the "distinctive attribute inferred in step S130" and the "learning image" (S140). The neural network 2 may be implemented as a recurrent neural network (RNN).

The learning process is completed as described, and hereinafter, the process of inferring will be described in detail.

In the process of inferring, an input of an image for generating a caption (hereinafter, referred to as an "inference image") is received, and, a distinctive attribute is inferred by inputting the image to the neural network 1 trained in step S120 (S150).

An image caption is generated by inputting a pair of the "distinctive attribute inferred in step S150" and the "inference image" to the neutral network 2 trained in step S140 (S160).

Up to now, the method and system for automatic image caption generation have been described with reference to preferred embodiments.

In the above-described embodiments, the method and the system for automatically generating a caption well indicating a feature of a given image, by which an image can be more exactly explained and a difference from other images can be clearly distinguished, have been suggested.

Figure 4:
FIG. 4 is a view illustrating comparison of a result of automatically generating a caption according to a related-art method, and a result of automatically generating a caption according to a method suggested in embodiments of the present disclosure.
Figure 4:

FIG. 4 illustrates comparison between a result of automatically generating a caption in a related-art method, and a result of automatically generating a caption according to the method suggested in the above-described embodiments of the present disclosure. It can be seen from FIG. 4 that the automatic caption generation method according to embodiments of the present disclosure well expresses the feature of a given image.

Figure 5:
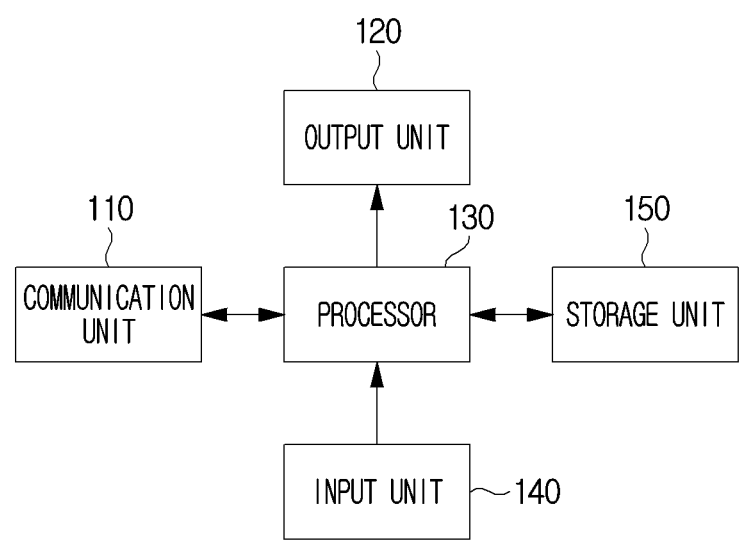
FIG. 5 is a block diagram of an automatic image caption generation system according to another embodiment of the present disclosure.

FIG. 5 is a block diagram of an automatic image caption generation system according to another embodiment of the present disclosure. The automatic image caption generation system according to another embodiment of the present disclosure may be implemented as a computing system, including a communication unit 110, an output unit 120, a processor 130, an input unit 140, and a storage unit 150 as shown in FIG. 5.

The communication unit 110 is a communicating means for receiving an input of training data and inference data from an external device and an external network. The input unit 140 is an inputting means for receiving an input of a user command, and the output unit 120 is a display for displaying an automatic image caption generation process and a result therefrom.

The processor 130 may execute the method illustrated in FIG. 1 or may implement the framework illustrated in FIG. 2 to perform the learning process and the inferring process to automatically generate an image caption.

The storage unit 150 provides a storage space necessary for operating the processor 130.

The neutral network mentioned in the above-described embodiments is mentioned as a kind of artificial intelligence model. The technical idea of the present disclosure can be applied to a case in which the neutral network is replaced with other kinds of artificial intelligence models.

In addition, embodiments of the present disclosure can be applied to still images, recorded videos, and videos shot in real time, and can be applied to the following fields:

1) Vision information-based situation explanation: smart glasses for the blind, explanation of situations at sides/back of a vehicle during a travel, CCTV video-voice conversion for households/security, automatic video content caption generation, story summary of video contents.

2) Image tagging: automatic generation of huge amounts of image data set (for example, data set for a neural network), an image text search service in a search engine, etc., automatic daily log generation (auto storage of explanation of a shot video by using face recognition or metadata (GPS, shooting time, etc.) information).

The technical idea of the present disclosure may be applied to a computer-readable recording medium which records a computer program for performing the apparatus and the method according to embodiments of the present disclosure. In addition, the technical idea according to various embodiments of the present disclosure may be implemented in the form of a computer-readable code recorded on a computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer-readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. An automatic image caption generation method comprising:
    extracting a distinctive attribute from example captions of a learning image;
    training a first neural network, for predicting a distinctive attribute from an input image, using a pair of the extracted distinctive attribute and the learning image;
    inferring a distinctive attribute by inputting the learning image to the trained first neural network; and
    training a second neural network, for generating a caption of the input image, using a pair of the inferred distinctive attribute and the learning image, wherein the method further comprises:
extracting only roots by pre-processing words included in the example captions;
selecting a predetermined number of words from the extracted roots; and
calculating scores of the selected words indicating how well the selected words expresses a feature of the learning image.

2. The automatic image caption generation method of claim 1, wherein the selecting comprises selecting a predetermined number of words, based on at least one of a frequency that the words appear in the example captions of the learning image, and a frequency that the words appear in example captions of other learning images.

3. The automatic image caption generation method of claim 1, wherein the calculating comprises assigning scores to the words in proportion to a number of times the words appear in the example captions of the learning image.

4. The automatic image caption generation method of claim 3, wherein the calculating comprises assigning scores to the words in inverse proportion to a number of times the words appear in example captions of other learning images.

5. The automatic image caption generation method of claim 1, wherein the calculating comprises assigning scores to the words in inverse proportion to a number of times the words appear in example captions of other learning images.

6. The automatic image caption generation method of claim 1, further comprising:
receiving, as the input image, an inference image for generating the caption;
inferring a distinctive attribute by inputting the inputted inference image to the trained first neutral network; and
generating a caption by inputting a pair of the inferred distinctive attribute and the inference image to the trained second neutral network.

7. The automatic image caption generation method of claim 1, wherein
the distinctive attribute corresponds to a determined matching relationship between the words and calculated scores corresponding to the words.

8. The automatic image caption generation method of claim 1, wherein the first neural network is implemented as a convolutional neural network, and the second neural network is implemented as a recurrent neural network.

9. A non-transitory computer-readable storage medium storing instructions that, when executed by a processor, cause the processor to perform the method of claim 1.

10. An automatic image caption generation apparatus, the apparatus comprising:
one or more processors configured to:
extract a distinctive attribute from example captions of a learning image;
train a first neural network for predicting a distinctive attribute from an image, by using a pair of the extracted distinctive attribute and the learning image;
infer a distinctive attribute by inputting the learning image to the trained first neural network; and
train a second neural network for generating a caption of an image by using a pair of the inferred distinctive attribute and the learning image,
wherein the one or more processors are further configured to:
extract only roots by pre-processing words included in the example captions;
select a predetermined number of words from the extracted roots; and
calculate scores of the selected words indicating how well the selected words expresses a feature of the learning image.

11. An automatic image caption generation method comprising:
receiving an input of an inference image for generating a caption;
inferring a distinctive attribute by inputting the inputted inference image to a trained first neutral network; and
generating a caption by inputting a pair of the inferred distinctive attribute and the inference image to a trained second neutral network,
wherein the first neural network is a neural network that is trained by a pair of a distinctive attribute extracted from example captions of a learning image, and the learning image to infer a distinctive attribute from the learning image,
wherein the second neural network is a neural network that is trained by a pair of the distinctive attribute inferred by the first neural network and the learning image to generate a caption of an input image from the input image, and
wherein the extracting further comprises:
extracting only roots by pre-processing words included in the example captions;
selecting a predetermined number of words from the extracted roots, and
calculating scores of the selected words indicating how well the selected words expresses a feature of the learning image.

* * * * *